United States Patent [19]

Middlin et al.

[11] Patent Number: 5,711,541
[45] Date of Patent: Jan. 27, 1998

[54] STABILIZATION APPARATUS

[75] Inventors: Andrew John Middlin, Bellbowrie; Keith Larsen, Birkdale, both of Australia

[73] Assignees: Hastings Deering (Australia) Limited, Archerfield; Vipac Engineers & Scientists Limited, Toowong, both of Australia

[21] Appl. No.: 488,720

[22] Filed: Jun. 8, 1995

Related U.S. Application Data

[63] Continuation-in-part of Ser. No. 987,628, Dec. 9, 1992, abandoned, which is a continuation-in-part of Ser. No. 715,478, Jun. 14, 1991, abandoned.

[30] Foreign Application Priority Data

Jun. 15, 1990 [AU] Australia ............................ PK 0668

[51] Int. Cl.$^6$ ........................................ B60D 1/32
[52] U.S. Cl. .................. 280/455.1; 280/483; 280/492; 280/504
[58] Field of Search ..................... 280/400, 423.1, 280/405.1, 407.1, 432, 439, 483, 484, 489, 492, 504, 440, 446.1, 455.1

[56] References Cited

U.S. PATENT DOCUMENTS

| | | | |
|---|---|---|---|
| 2,833,556 | 5/1958 | Kling | 280/405.1 |
| 2,847,230 | 8/1958 | Hendrickson et al. | |
| 3,014,739 | 12/1961 | Kress | |
| 3,092,399 | 6/1963 | Hair | |
| 3,118,686 | 1/1964 | McAdams | 280/489 X |
| 3,136,566 | 6/1964 | Harding | |
| 3,311,389 | 3/1967 | Barton et al. | 280/489 |
| 3,363,914 | 1/1968 | Neel, Jr. | |
| 3,680,892 | 8/1972 | Olthoff et al. | 280/492 X |
| 3,827,518 | 8/1974 | Kuhl et al. | |
| 4,097,060 | 6/1978 | Unruh | 280/492 |
| 4,149,606 | 4/1979 | Hawk | |
| 4,313,616 | 2/1982 | Howard | |
| 4,756,543 | 7/1988 | Cromnow et al. | |
| 4,934,727 | 6/1990 | Hawkins et al. | |

Primary Examiner—Victor E. Johnson
Attorney, Agent, or Firm—Dvorak & Orum

[57] ABSTRACT

A stabilization apparatus for stabilizing articulated vehicles includes a damping device connected between a prime mover and its trailer and is arranged about the articulation pivot. The damping device provides resistance to movement of the trailer relative to the prime mover substantially reducing undesirable loping motion of the prime mover.

9 Claims, 6 Drawing Sheets

STABILIZATION APPARATUS

This application is a continuation-in-part of application Ser. No. 07/987,628, filed Dec. 9, 1992, and now abandoned which is a continuation-in-part of U.S. Ser. No. 07/715,478 filed Jun. 14, 1991 and now abandoned.

BACKGROUND OF THE INVENTION

1. Field of the Invention

This invention has particular but not exclusive application to the stabilization or damping of vibrations in heavy-haulage vehicles, and for illustrative purposes reference will be made to such application. However, it is to be understood that this invention could be used in other applications, such as stabilizing travelling caravans.

2. Discussion of the Prior Art

Many articulated vehicles of the type having a driver controlled prime mover and a trailer suffer from a vibration problem known as "loping", in which a pitching motion is induced in the prime mover about a transverse axis located near its rear end. As the driver's cab is mostly located in the vicinity of the front axle of the vehicle, the driver is subjected to a vertical shaking motion. It is known that loping is generally induced by imbalance or out-of-round in the front tires of the vehicle, and by undulations in the road. It is also known that high friction in the front suspension springs causes bumps to be absorbed primarily by the lightly-damped tires rather than the damped suspension springs, so that oscillations are not damped out rapidly. Vehicles using tires of radial construction are particularly susceptible because of the low stiffness and light damping offered by such tire construction.

The problem can be particularly severe in the case of large off-road semi-trailers used for the haulage of minerals such as coal at mine sites. The prime movers of these vehicles, which typically have payloads in the order of two hundred tonnes, have very short wheelbases relative to their height, width and trailer length and loping vibrations can be particularly severe on the driver. Efforts have been made to eliminate loping by stricter controls on tire characteristics and reduced-friction springs, but the problem still occurs.

Typical loping characteristics in an off-road vehicle produce vertical movement amplitudes in the order of 10 mm which equates to a rotational movement of the prime mover relative to the trailer of the order of 0.1 degrees. This small pivotal movement is very difficult to control, partly because the mechanical components must allow free pivotal movement in the order of plus or minus twenty degrees and thus are not amenable to the fine control required for eliminating or substantially reducing loping oscillations.

SUMMARY OF THE INVENTION

The present invention aims to alleviate the above disadvantages and to provide stabilization apparatus which will be reliable and efficient in use.

For the purposes of this specification a reference to "viscous damping" is to be a reference to a force or moment applied to a vibrating element in an orientation which tends to reduce the amplitude of the vibration, and with a magnitude or moment which increases according to the instantaneous velocity of the vibration. A reference to "Coulomb damping" is to be a reference to a force or moment applied to a vibrating element in an orientation which tends to reduce the amplitude of the vibration, with the magnitude of the force or moment being substantially constant. Constant force damping provides friction type characteristics whereby such damping will prevent relative movement of interconnected bodies until a certain preset force limit is exceeded.

Furthermore a reference to "prime mover" is to be a reference to a steerable powered vehicle having front and rear wheels, and a hitch assembly to which a trailer is or may be hitched for trailing therefrom, the hitch assembly forming an articulated connection having a vertical articulating pivot, a longitudinal roll pivot and a transverse load equalizing pivot, wherein the vertical articulating pivot enables the prime mover to pivot relative to the trailer about a vertical axis whereby the trailer can follow the steered course of the prime mover, the longitudinal roll pivot enables the prime mover and the trailer to roll about a longitudinal axis independent of one another, and the transverse load equalizing pivot enables the prime mover and the trailer to pivot relative to one another about a transverse axis so as to maintain substantially constant loads on the front and rear axles of the prime mover and on the trailer axles when the trailer and prime mover assume different longitudinal inclinations.

A reference to a double acting hydraulic cylinder assembly is to be a reference to a hydraulic cylinder assembly having a piston within a cylinder forming fluid chambers at opposite sides of the piston which vary in volume according to the position of the piston within the cylinder.

With the foregoing in view, this invention in one aspect resides broadly in a stabilization apparatus for an articulated vehicle of the type having a prime mover joined to a trailer by a hitch assembly in the form of an articulated connection having a vertical articulating pivot, a longitudinal roll pivot and a transverse load equalizing pivot, the stabilization apparatus comprising:

- a double acting hydraulic cylinder assembly attached to the hitch assembly so that loping of the prime mover resulting in cyclical changes of the longitudinal inclination of the prime mover relative to the trailer about the transverse load equalizing pivot, moves the piston of the double acting hydraulic cylinder assembly through the cylinder, and
- fluid flow control means for controlling the flow of fluid to or from the fluid chambers at opposite sides of the piston for attenuating the pitching movement of the prime mover.

The damping means attenuates the pitching motion of the prime mover by inducing vibration-damping torques about the transverse load equalizing pivot as the prime mover pitches, using viscous or friction type damping.

The damping means may include a double acting rotary damper associated with the transverse load equalizing pivot. However in a preferred embodiment the damping means includes a linear damper attached between a prime mover mounting disposed remote from the pivot axis of the transverse load equalizing pivot and a trailer damper mounting attached to the trailer remote from the pivot axis of the transverse load equalizing pivot such that the linear damper may be extended or retracted by pivotal motion of the prime mover relative to the trailer about the transverse load equalizing pivot. A pair of linear dampers may be used if required and disposed at opposite sides of the hitch assembly.

The double-acting hydraulic ram assembly may be formed as two separate but opposing hydraulic rams or the like, but it is preferred that they form the opposed chambers of a double acting ram. In the case where the transverse pivot is attached to a longitudinal roll pivot and/or vertical pivot pin assembly, as is the case for heavy-haul trailers, the damping means may include a pair of linear dampers which may be disposed on either side of the longitudinal or vertical pivot pin such that the damping forces may be balanced about the centerline of the vehicle. Alternatively a single damper disposed about the centerline of the vehicle may be used.

Suitably, each linear damper includes a pair of fluid chambers charged with fluid and interconnected by external connection means such that pitching motion of the prime mover induces a flow of fluid through the connection means, and the fluid connection means includes restrictor means for dissipating energy in order to provide viscous damping and/or pressure relief means in order to limit the maximum reaction force applied by the linear damper to provide constant force damping. The restrictor means may include an aperture formed in a piston, or an external restrictor valve, flow-control valve or the like.

The constant force damping means may form clamping means adapted for selectively holding the prime mover and the trailer in a selected orientation unless a pre-determined load is applied to the damping means by excessive pitching movement and then releasing to permit free or controlled pivoting of the prime mover relative to the trailer about the pivot as desired. Suitably, the pressure relief means is set such that the hydraulic ram assembly maintains a releasable clamp across the transverse load equalizing pivot up to an applied load caused by pivotal movement of the prime mover relative to the trailer for following irregular road profiles. While the clamping means is in operation, the trailer and the prime mover may have vibration characteristics more closely resembling a rigid vehicle having natural frequencies of pitch and bounce whereby the prime mover and trailer are less susceptible to excitation than an equivalent articulated vehicle wherein the prime mover and trailer are free to oscillate independently about their respective transverse axles.

In another aspect, this invention resides in a method of damping pitching vibrations in a prime mover connected to a trailer through a hitch assembly, including:

providing damping means for damping rotational vibration about the transverse load equalizing axis, and connecting said damping means to the prime mover and trailer assembly such that oscillatory rotation of the prime mover about the transverse load equalizing axis relative to the trailer may be damped thereby. If desired the damping means may be a friction damper such as a brake band supported about a brake drum coaxial with the transverse load equalizing axis or it may include a pair of linkages extending to the relatively moveable components to be damped and interconnected by a joint including a disc brake or the like able to lock the linkages against relative movement against an applied force which is less than a preset limit.

In a further aspect this invention includes stabilization apparatus for an articulated vehicle of the type having a prime mover joined to a trailer by a hitch assembly in the form of an articulated connection having a vertical articulating pivot, a longitudinal roll pivot and a transverse load equalizing pivot, the stabilization apparatus comprising:

a damper assembly having relatively moveable damping components attached to the hitch assembly so that loping of the prime mover, resulting in cyclical changes of the longitudinal inclination of the prime mover relative to the trailer about the transverse load equalizing pivot, operatively moves the damping components relative to one another, and said damper assembly being formed to provide constant force damping whereby the trailer and the prime mover, when operating on level surfaces, have vibration characteristics closely resembling a rigid vehicle.

DESCRIPTION OF THE PREFERRED DRAWINGS

In order that this invention may be more readily understood and put into practical effect, reference will now be made to the accompanying drawings which illustrate a preferred embodiment of the invention, wherein.

DETAILED DESCRIPTION OF THE PREFERRED EMBODIMENT

Figure 1:
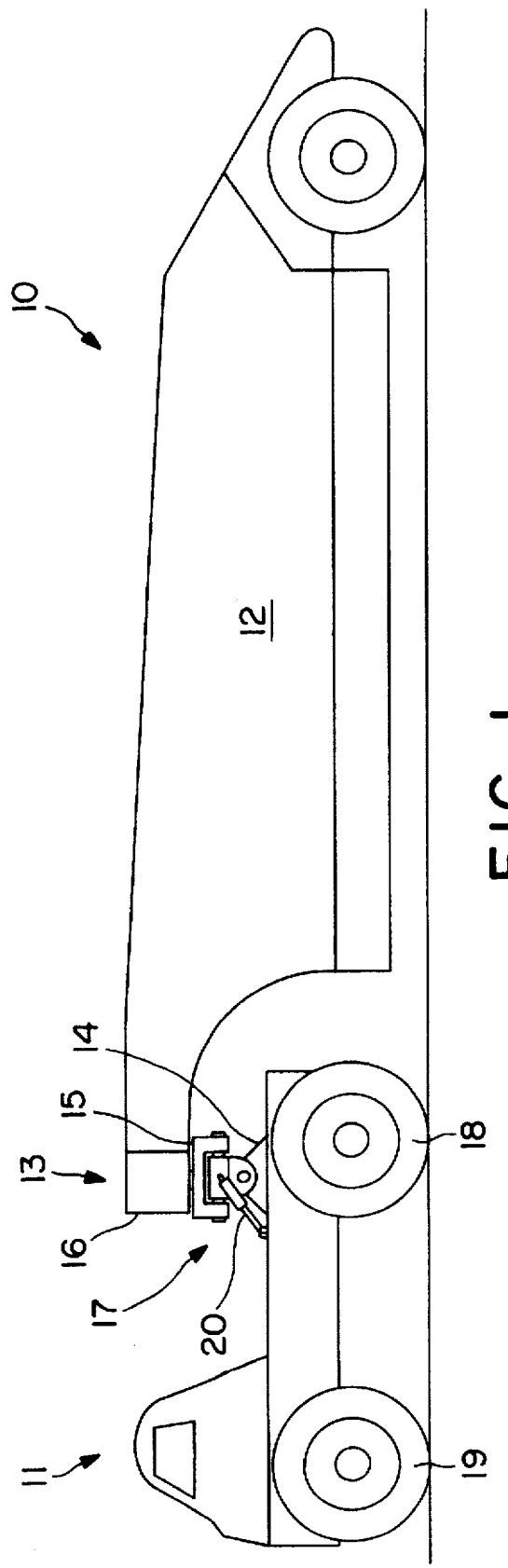
FIG. 1 is a pictorial side view of a prime mover/trailer combination including pitch damping apparatus according to the invention.
Figure 2:
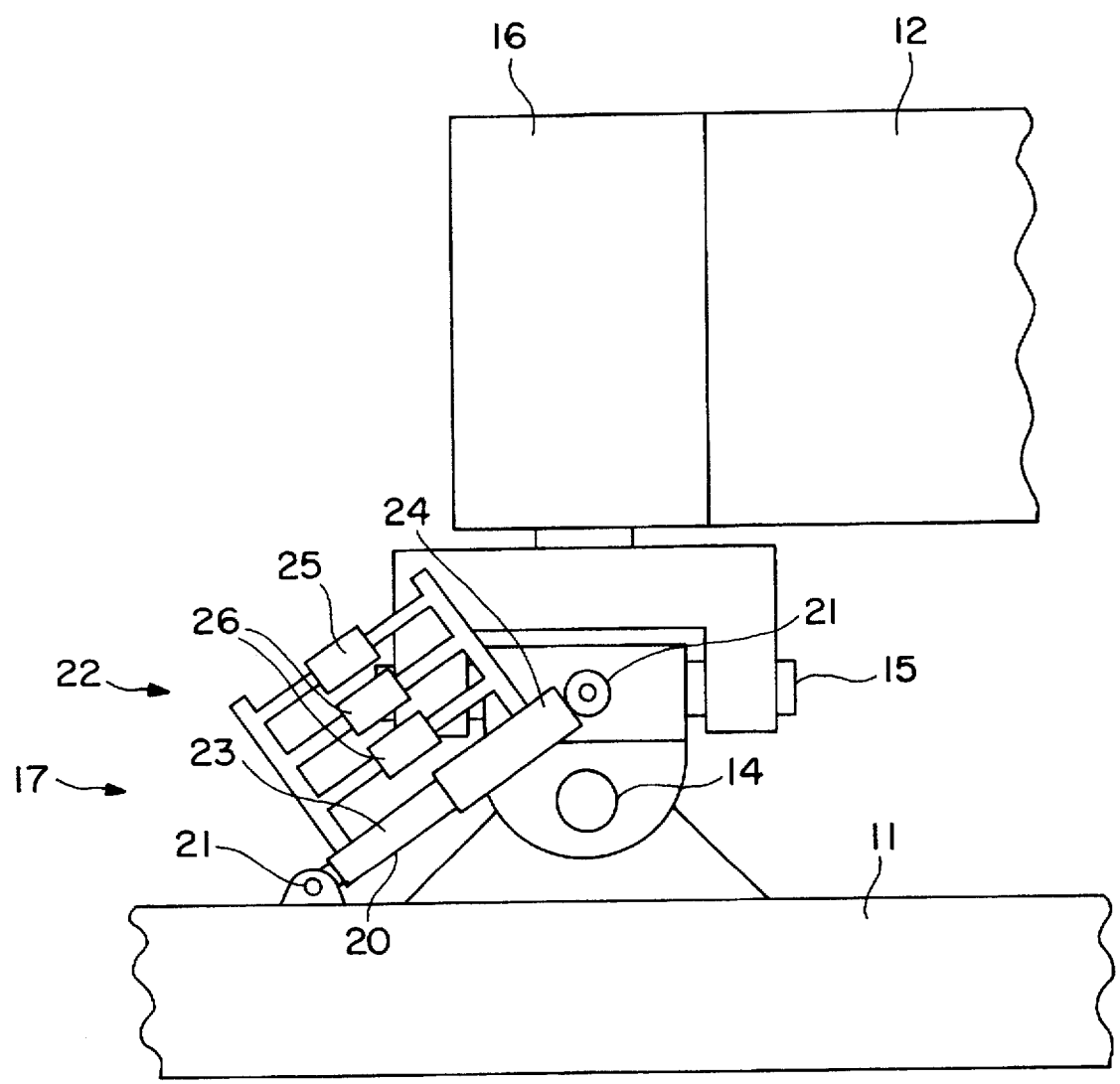
FIG. 2 is a cross-sectional side view of the pitch damping apparatus shown in FIG. 1.

The prime mover/trailer combination 10 shown in FIG. 1 includes a prime mover 11 connected to a trailer 12 through a hitch assembly 13. In conventional manner, the prime mover has a pair of rear driven wheels 18 and a pair of steerable front wheels 19. The hitch assembly 13 comprises a transverse load equalizing pivot assembly 14 attached between the prime mover 11 and a longitudinal roll pivot assembly 15, and the latter is an turn attached to the trailer 12 through a vertical articulating pivot assembly 16.

A damper assembly 17 comprises a pair of double-acting hydraulic cylinders 20 mounted between the longitudinal roll pivot assembly 15 and the prime mover 11 on cylinder pivots 21, as well as damping control apparatus, illustrated diagrammatically at 22, connected between the two hydraulic chambers 23 and 24 of each of the cylinders 20. The damping control apparatus 22 includes restrictors 25 and pressure relief valves 26.

If desired, one of the cylinders 20 may be mounted to the prime mover 11 behind the hitch assembly 13 such that rotation of the trailer 12 relative to the prime mover 11 about the transverse equalizing pivot assembly 14 will extend one cylinder and retract the other. The rod-side chambers of both cylinders 20 may then be coupled by damper control apparatus 22, and the piston-side chambers of both cylinders 20 may also be coupled by further damper control apparatus 22. This arrangement permits the use of standard hydraulic cylinders without problems in respect of the difference in cross-sectional areas between rod-side and piston-side chambers.

If the prime mover 11 develops a loping or pitching motion during operation, the hitch assembly 13 rotates in oscillatory motion about the transverse equalizing pivot assembly 14. This oscillatory motion causes extension and retraction of the hydraulic cylinders 20, forcing fluid between the chambers 23 and 24 through the restrictors 25. The forces produced by this action act to dampen out the pitching vibrations. If these forces reach an undesirably high level, the pressure relief valves 26 act to bypass the restrictors 25.

If desired, the restrictors 25 may be deleted whereby the hydraulic cylinders 20 may effectively lock the transverse pivot assembly up to a torque level at which the pressure relief valves 26 function to provide constant force damping only. This permits the articulated vehicle to function with fewer modes of vibration while minimising excessive forces at the pivot 14 due to road irregularities.

Figure 3:
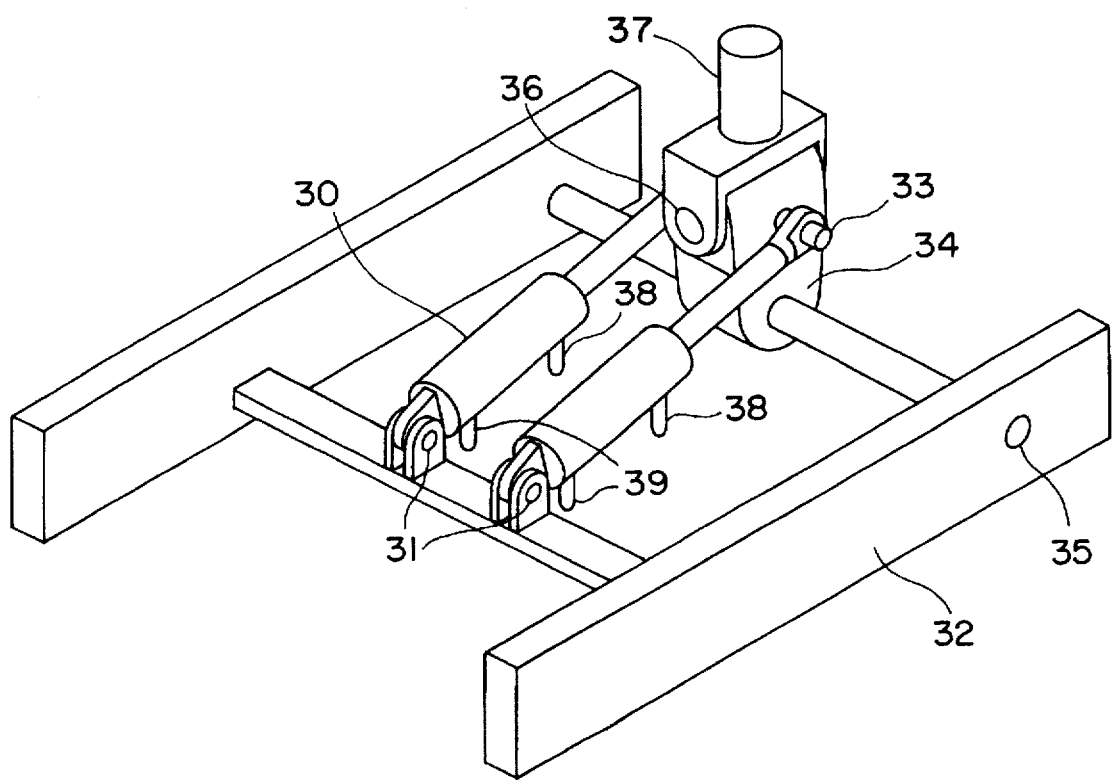
FIG. 3 is a pictorial view of a further embodiment of pitch damping apparatus.
Figure 4:
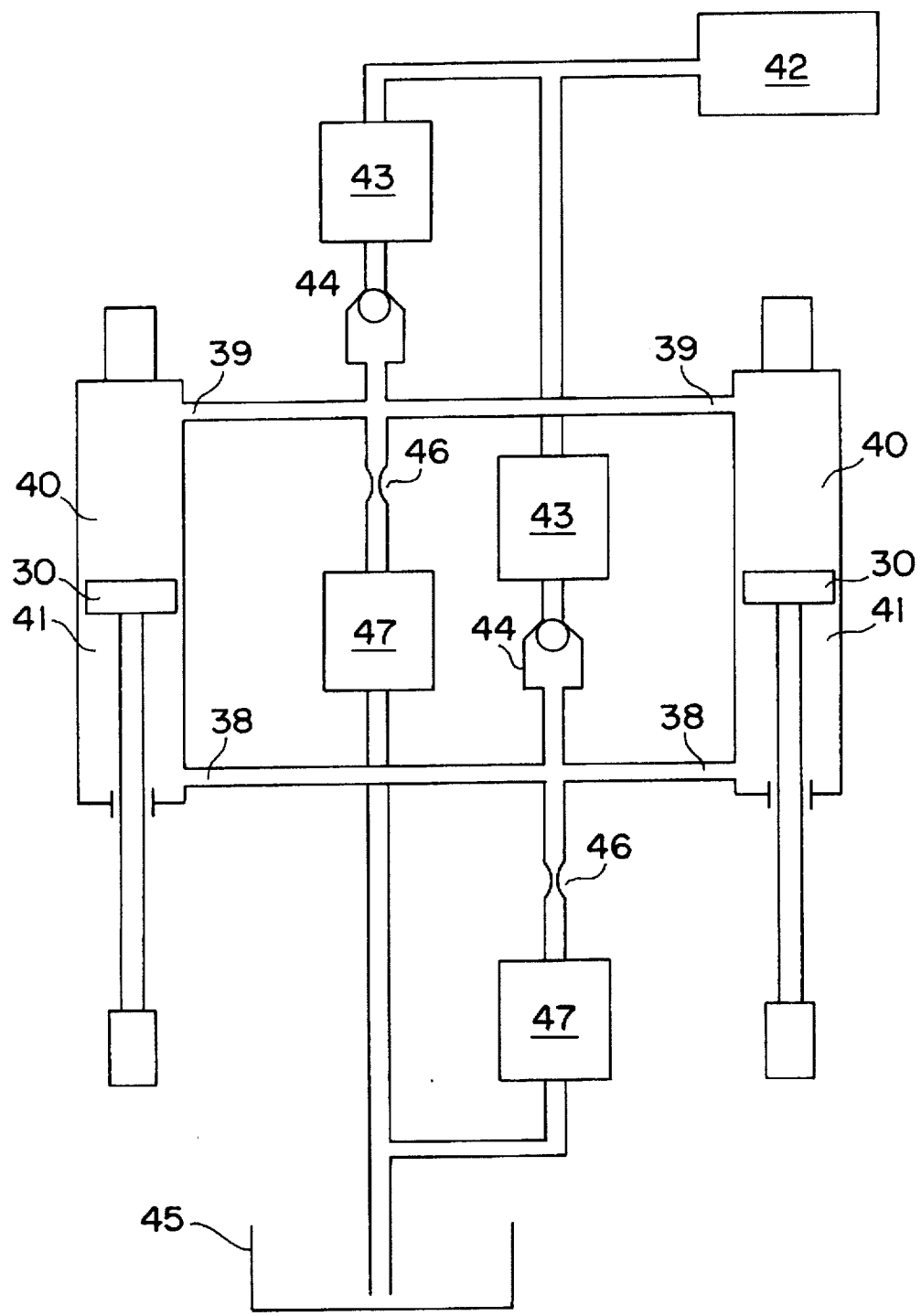
FIG. 4 is a schematic diagram of the hydraulic system for the pitch damping apparatus shown in FIG. 3.

Referring now to FIGS. 3 and 4, it will be seen that the double-acting hydraulic cylinders 20 are connected between chassis lugs 31 attached to the prime mover chassis rails 32 and coupling lugs 33 attached to the sides of the longitudinal pivot assembly 34, the latter pivoting on a transverse pivot 35 attached between the prime mover chassis rails 32. The longitudinal pivot assembly 34 is surmounted by a longitudinal pivot 36, and a vertical pivot assembly 37, to which a trailer may be coupled.

The piston-side chambers 40 of both cylinders 30 are connected together, as are the rod-side chambers 41 through port connections 38 and 39. Each pair of chambers 40 and 41 are connected to a hydraulic fluid source 42 through a pressure-regulating valve 43 and a check-valve 44, and to a fluid drain tank 45 through a restrictor 46 and a pressure-relief valve 47.

Pitching movement of the prime mover relative to the trailer about the transverse pivot 35 tends to extend or contract the cylinders 30, extension causing a rise in fluid pressure in the piston-side chambers 40, and contraction causing a rise in fluid pressure in the rod-side chambers 41. If the fluid pressure remains below the relief setting of the appropriate pressure-relief valve 47, the cylinders 30 will not extend or retract, and pitching of the prime mover about the transverse pivot 35 will be inhibited. If the fluid pressure in the chambers 40 does rise above the relief setting of the appropriate pressure-relief valve, fluid will flow from the chambers 40 through the restrictor 46 and the pressure-relief valve 47 to the drain tank 45, dissipating energy and damping out the movement. The consequent increase in volume of the chambers 41 will be filled from the fluid source 42 through the pressure-regulating valve 43. A complementary effect applies if the pressure in the rod-side chambers 41 increases above the relief-valve setting.

The pitch damping apparatus of FIGS. 3 and 4 is particularly useful in applications where it is desirable to utilise standard hydraulic cylinders, in which the piston-side and rod-side chambers have different piston areas and it is thus not practicable to transfer fluid between such chambers. It has the disadvantage that it requires constant pressurization from a source of hydraulic fluid, but such a source is normally available on such a vehicle, and the circulation of the damping fluid through the vehicle's hydraulic system allows heat generated within the stabilization apparatus to be dissipated by the vehicle's hydraulic cooling system.

Figure 5:
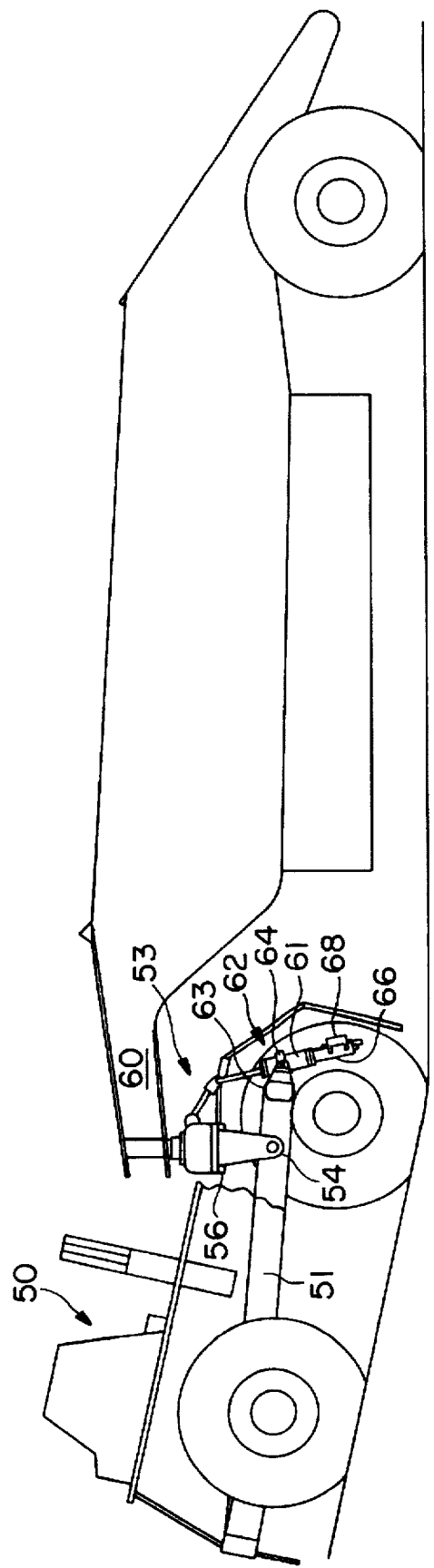
FIG. 5 is a part-sectional elevation of an articulated vehicle hitch including an alternate form of stabilization apparatus according to the invention.
Figure 6:
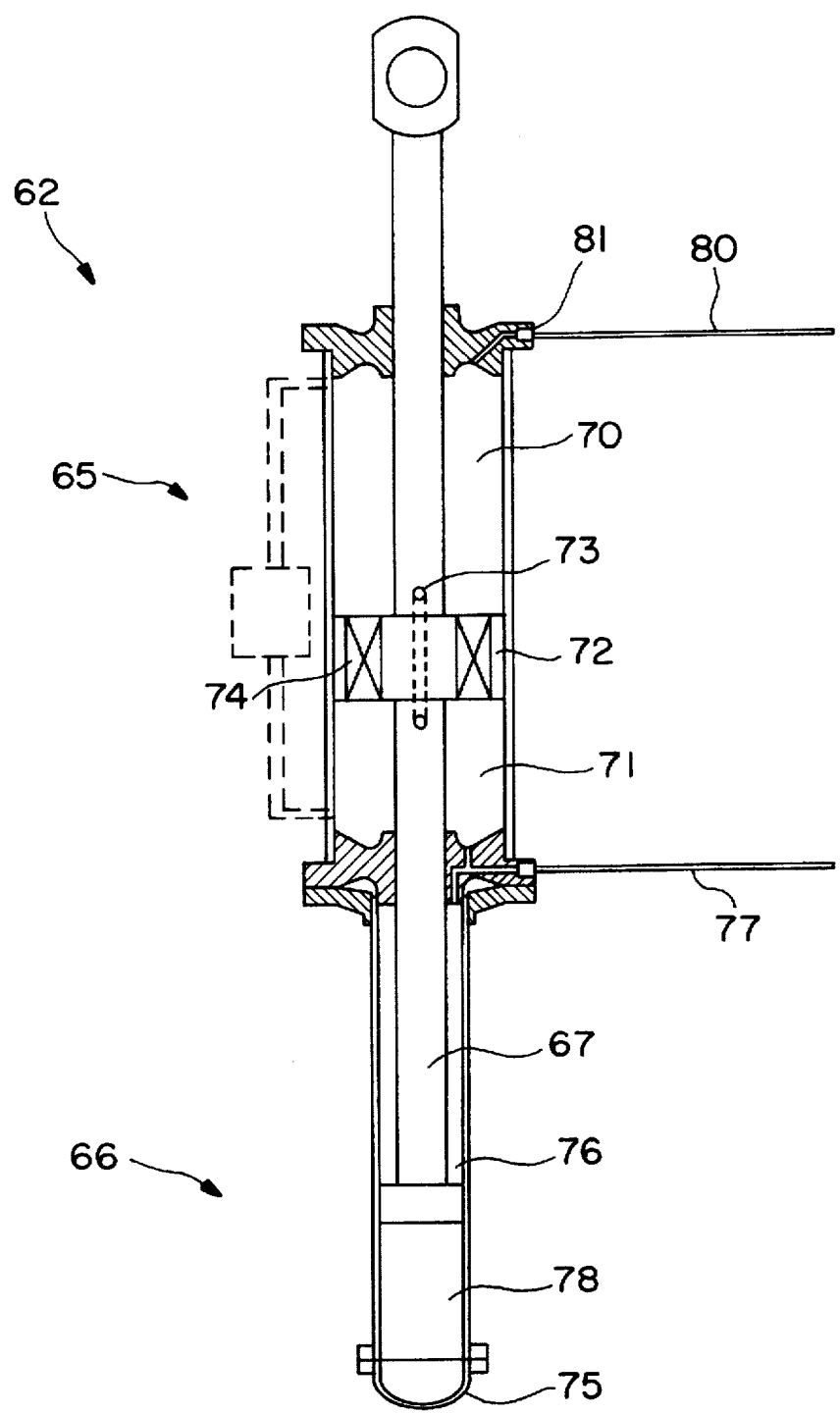
FIG. 6 is a cross-sectional view through the stabilization apparatus illustrated in FIG. 5.

In the embodiment illustrated in FIGS. 5 and 6, the chassis 51 of a prime mover 50, which is shown cutaway to reveal the hitch assembly 53, which connects to the leading end 60 of a trailer. A single centrally mounted damper assembly 62 is attached to a chassis cross-member 63 via a gimbal ring 64 attached to the body 61 of the damper assembly 62. It will be seen that the damper assembly 62 comprises a unitary upper, double-acting hydraulic cylinder 65, and a lower preload cylinder 66, the pistons within the cylinders 65 and 66 sharing a common piston rod 67, the exposed end of which is connected to the transverse pivot assembly 54 behind the longitudinal pivot assembly 56. The preload cylinder illustrated in FIG. 6 is a single-acting cylinder while the preload cylinder illustrated in FIG. 5 is a double-acting cylinder provided with an external valve body 68 which may be selectively adjusted to open either the piston-side cylinder 78 or rod-side cylinder 76 to the chamber 71. The preload applied by the piston-side cylinder 78 will maintain a compressive preload on the piston rod 67. The valve body may be also locked to disable the effect of the preload cylinder if desired and appropriate pressure relief valves may be included in the valve body.

Referring to the FIG. 6 embodiment it will be seen that the double-acting hydraulic cylinder 65 is divided into an upper chamber 70 and a lower chamber 71 by a piston 72. As the piston rod 67 passes out of the double-acting hydraulic cylinder at both of its ends, the chambers 70 and 71 are of equal annular cross-sectional area. The piston rod 67 is penetrated by a damping passage 73 which connects the chambers 70 and 71 and the piston 72 contains a series of relief valves 74 which allow fluid to pass in either direction between the chambers 70 and 71 when a preset pressure differential exists between them.

The outer end of the preload cylinder 66 is closed by a vented cylinder head 75. The chamber 76 of the preload cylinder 66 and the lower chamber 71 are connected to a supply of pressurized hydraulic oil 77. The upper chamber 70 is connected to a fluid drain 80 through a bleed orifice 81, the latter having a very low flow rate relative to the damping passage 73. This arrangement has several advantages. Circulating oil assists cooling and thus efficient operation. The upwardly directed flow of fluid tends to purge entrapped air from the chambers and the pressure reduces the volume of any remaining air and thus increases the efficiency of damping and the effective stiffness of the damping.

The tensile preload induced in the damper assembly 62 by the preload cylinder 66 minimizes all mechanical clearances within the mounting pivots of the damper assembly 62 and the hitch assembly 53, as in use these are fully taken up by the preload. Thus for pitch vibrations of small magnitude, there is no lost motion in the damping mechanism due to such mechanical clearances, ensuring that effective damping can occur, even for pitching vibrations of an amplitude of the same order as the clearances within the mounting pivots.

Alternatively the double acting cylinder assembly may be in the form of a conventional cylinder assembly with the piston side of the chamber having a greater area than the rod side of the chamber such that equal pressure applied to both sides will result in a preload tending to maintain the piston rod preloaded in compression. The viscous damping aperture may pass directly through the piston, being formed between a longitudinal bypass groove in the cylinder wall of the piston or it may be formed as an external passage which may have accessible flow adjustment means if desired.

In use, the pressurized oil supply is energized, filling the lower chamber 71 directly and the upper chamber 70 through the damping passage 73. The pressurized oil supply also applies a tensile preload to the damper assembly 62 through the preload cylinder 66. When pitching motion develops for the prime mover 51 relative to the trailer 52 about the transverse pivot assembly 54, the piston rod 67 is forced to slide relative to the hydraulic cylinder 65. Such movement can only occur if fluid flows between the upper chamber 70 and the lower chamber 71. When the pitching forces applied to the piston rod 67 are relatively low, the fluid passes between the chambers 70 and 71 through the damping passage 73, dissipating energy and damping out the vibration. If the pitching forces become larger, or if the vehicle is obliged to pivot about the transverse pivot assembly 54 to conform to changing road profiles, such as is illustrated in FIG. 5, the relief valves 74 will open allowing rapid movement of the damper assembly 62 without developing excessive pressures within the chambers 70 and 71.

The damping passage 73 can be replaced by an external damping passage provided, as shown in dotted outline, and provided with an adjustable restrictor (not shown) so that the damping effect can be easily modified. In a further embodiment the damping passage can be eliminated to provide constant force damping characteristics as all fluid flow between the chambers 70 and 71 must then pass through the relief valves 74.

While the above has been given by way of illustrative examples of this invention it will of course be realised that all such modifications and variations thereto as would be apparent to persons skilled in the art are deemed to fall within the broad scope and ambit of this invention as is defined in the appended claims.

We claim:

1. An articulated vehicle including a prime mover joined to a trailer by a hitch assembly, said assembly including a transverse load equalizing pivot assembly, a longitudinal roll pivot assembly, and a vertical articulating pivot assembly, said transverse load equalizing pivot assembly connected to said prime mover, said vertical articulating pivot assembly connected to said trailer, and said longitudinal roll pivot assembly interconnecting said transverse load equalizing pivot assembly to said vertical articulating pivot assembly, the longitudinal pivot assembly providing a pivotal movement about a longitudinal roll point, and including a stabilization apparatus comprising:

a first cylinder pivot located on the longitudinal roll pivot assembly and spaced from the transverse load equalizing pivot assembly;

a second cylinder pivot located on the prime mover and spaced from the transverse load equalizing pivot assembly;

a double acting hydraulic cylinder assembly extending between said first and second cylinder pivots, said double acting hydraulic cylinder assembly having a ram shaft assembly comprising a cylinder body containing a ram piston supported by a ram shaft, said ram shaft extending to and connected with one of said cylinder pivots and said cylinder body extending to and connecting with the other of said cylinder pivots;

opposed fluid chambers formed within the cylinder body and defined at opposite sides of the ram piston;

fluid flow control means for controlling the flow of fluid to and from said fluid chambers including a ram piston bypass passage and a pressure relief valve each communicating with the opposite fluid chambers, said pressure relief valve permitting flow between chambers when fluid pressure in one of said chambers reaches a predetermined pressure.

2. The articulated vehicle as defined in claim 1, wherein the double acting hydraulic cylinder assembly includes a preload means which maintains the double acting hydraulic cylinder assembly in one of a state of tension and compression between said cylinder pivots, said preload means having a pair of ends.

3. The articulated vehicle as defined in claim 2, wherein the preload means is a single-acting preload cylinder attached at one end to the cylinder body of the double acting hydraulic cylinder assembly and at its other end to said ram shaft assembly of said double acting hydraulic cylinder.

4. The articulated vehicle as defined in claim 3, wherein the single-acting preload cylinder includes a piston mounted on the same ram shaft of the double acting cylinder assembly and is located remote from the ram piston wherein the single-acting preload cylinder communicates with a presurized fluid supply so as to maintain the ram shaft in tension.

5. The articulated vehicle as defined in claim 4, further including a common pressurized fluid supply, said common supply supplying both the single-acting preload cylinder and the double acting hydraulic cylinder assembly and wherein said common pressurized supply enters the double acting hydraulic cylinder assembly at a lower location and exits at an upper location.

6. The articulated vehicle as defined in claim 2, wherein the double acting hydraulic cylinder assembly extends between an upper mounting on the hitch assembly and a lower mounting on the prime mover, wherein the lower mounting is a gimbal mounting.

7. The articulated vehicle as defined in claim 2, wherein said cylinder pivot on the prime mover is a gimbal mounting.

8. In an articulated vehicle comprising a prime mover joined to a trailer by an articulating connection having a longitudinal pivot assembly, said longitudinal pivot assembly providing pivotal movement about a longitudinal roll pivot and a transverse load equalizing pivot, a stabilization apparatus comprising:

a first cylinder pivot on the longitudinal pivot assembly spaced from the transverse load equalizing pivot;

a second cylinder pivot on the prime mover and spaced from the transverse load equalizing pivot;

a double acting hydraulic cylinder assembly extending between and mounted to said first and second cylinder pivots, said double acting hydraulic cylinder assembly having a ram shaft assembly comprising a ram piston having a pair of sides and supported by a ram shaft within a cylinder body, said ram shaft extending to one of said cylinder pivots and said cylinder body extending to the other of said cylinder pivots;

opposed fluid chambers formed within the cylinder body at opposite sides of the ram piston;

fluid flow control means for controlling the flow of fluid to and from said fluid chambers for attenuating a pitching movement of the prime mover and including a ram piston bypass passage and a pressure relief valve communicating with the opposed fluid chambers; and preload means adapted to maintain the double acting hydraulic cylinder assembly in one of a state of tension and compression between said first and second cylinder pivots.

9. A stabilization apparatus in combination with an articulated vehicle, comprising:

a transverse load equalizing roll pivot;

a longitudinal roll pivot assembly having a first cylinder pivot spaced from the transverse load equalizing roll pivot;

a double acting hydraulic cylinder assembly having a cylinder body and a ram shaft assembly contained therein and comprising a ram piston supported by a ram shaft and forming opposed fluid chambers within the cylinder body at opposite sides of the ram piston, said double acting hydraulic cylinder assembly having a pair of ends;

fluid flow control means for controlling the flow of fluid to and from said fluid chambers and including a ram piston bypass passage and a pressure relief valve communicating with the opposed fluid chambers, wherein one end of said double acting hydraulic cylinder assembly is mounted to said first cylinder pivot, said other end being mounted to a second cylinder pivot located on the articulated vehicle, said second pivot located at a position spaced from said transverse load equalizing roll pivot.

* * * * *